Jan. 19, 1937.   F. KREIS   2,068,185
AUTOMATIC CLUTCH
Original Filed Feb. 4, 1935
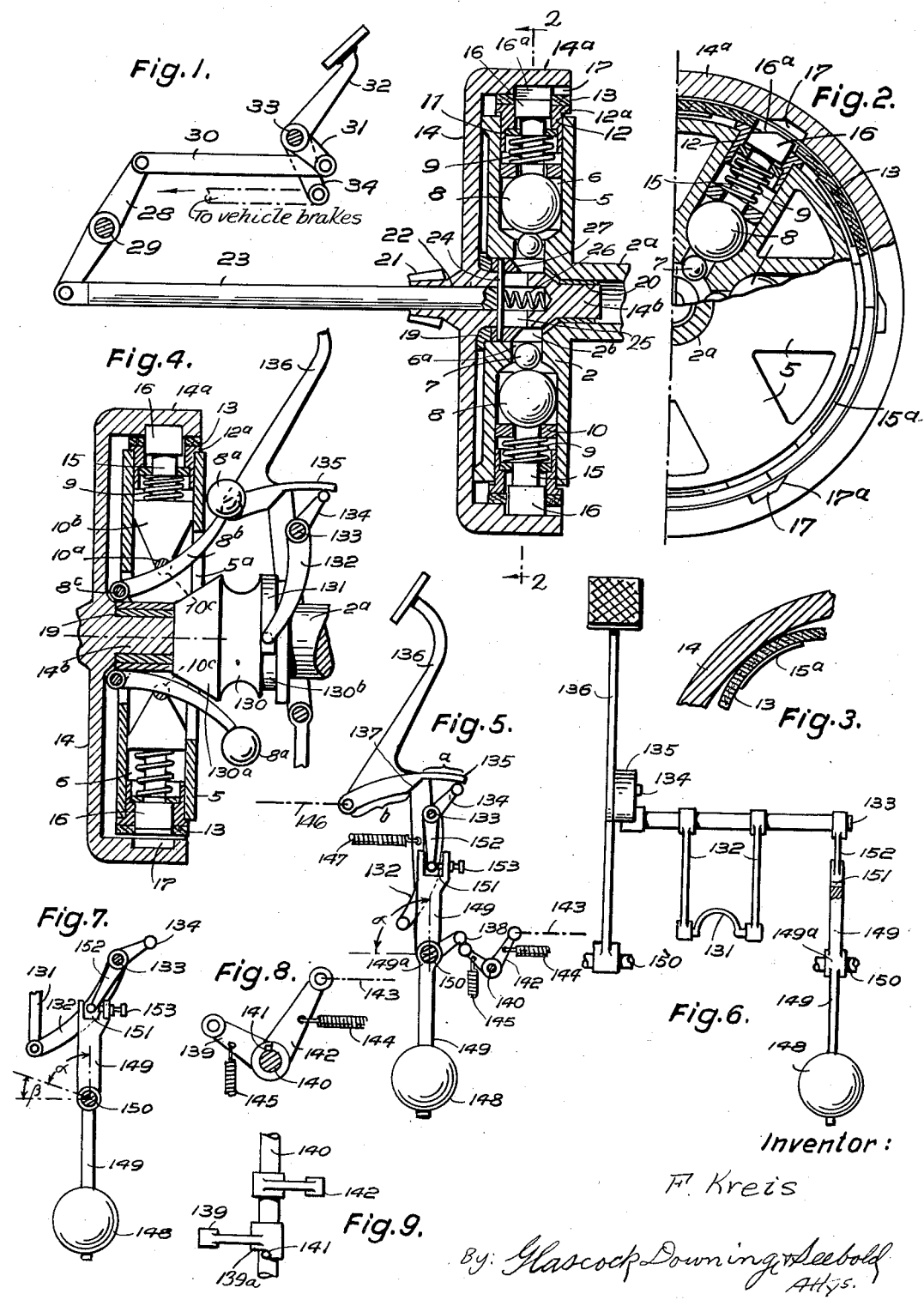
Inventor:
F. Kreis
By: Glascock Downing & Seebold
Attys.

Patented Jan. 19, 1937

2,068,185

UNITED STATES PATENT OFFICE 2,068,185

AUTOMATIC CLUTCH

Fritz Kreis, Nuremberg, Germany

Original application February 4, 1935, Serial No. 4,925. Divided and this application October 9, 1935, Serial No. 44,273. In Germany October 7, 1933

9 Claims. (Cl. 192—.01)

The invention relates to centrifugally operated automatic clutches for motor driven vehicles. Most of these clutches depend exclusively upon a frictional engagement between the clutch members, some, however, have provided an additional automatic locking mechanism for obtaining a positive drive engagement in the higher speed ranges. One object of the invention is to provide an automatic clutch of a very simple structure requiring fewer parts and having centrifugally-operated clutch elements between the drive and the driven member adapted to establish in succession both a frictional and a positive drive engagement between the said members.

A further object of the invention is to provide an automatic clutch embodying a control mechanism to be actuated by the driver for locking the automatic operation of the clutch elements by bringing same into positive drive engagement with the clutch members and keeping them in this position, so that the motor can be connected at any speed and preferably at low speed with the driven shaft, to act as a brake.

A still further object of the invention is to provide an automatic free wheeling clutch having a gravity controlled mechanism for locking the clutch elements, when the vehicle moves downhill, so that in such event independent from the care of the driver the motor is positively connected with the driven shaft to act as a brake.

Further features of the invention are the combination of the manually operated and the gravity controlled mechanisms with each other and with the brake and the motor controlling means, whereby all operations can be carried out by a single control lever or pedal.

Other features are hereinafter set forth and more particularly defined by the claims.

In the drawing Fig. 1 is a sectional view through a clutch embodying the invention.

Fig. 2 shows the clutch one quarter in section on line 2—2 of Fig. 1 and one quarter in elevation.

Fig. 3 shows the arrangement of the clutch lining according to Fig. 2.

Fig. 4 is a sectional view through a modified form of a clutch with a control sleeve in elevation.

Figs. 5 and 6 are a side and a front elevation of the pedal mechanism for operating the clutch sleeve, the carburettor and the brake and of the automatic weighted swinging lever.

Fig. 7 is a side elevation of the weighted swinging lever when the vehicle is in a forwardly inclined position.

Fig. 8 is a side elevation and

Fig. 9 is a plan showing parts of the pedal mechanism according to Fig. 5 to an enlarged scale.

Referring to the drawing the numeral 2 designates the drive member having a motor driven shaft portion 2a. The drive member 2 is a wheel having a number of radial spokes 5, for instance six spokes, with bores 6 open to the outer periphery. In the bore of each spoke 5 a ball 8 is situated adapted to slide within the bore 6 of the spoke under the influence of centrifugal force when rotating together with the wheel body 2. Outward movement of the balls 8 is resisted and accurately adusted by compression springs 9 arranged in the bores 6 of the spokes 5 above the balls 8. Rings 10 are interposed between the inner ends of the springs 9 and the balls 8. The outer ends of the springs 9 engage with rings 11 bearing against inwardly projecting flanges of sleeves 12, which are slidably mounted in the bores 6 near the periphery of the wheel body 2. The sleeves 12 possess flanges 12a projecting at their outer ends and lying between the outer circumference of the wheel body 2 and the inner face of a clutch lining 13 enclosing the wheel body 2. The lining 13 is divided up over the whole of the periphery into six segments, each segment contacting at each end with a flange 12a of the sleeves 12. The outer faces of the segments of the lining 13 are located with small clearance within a surrounding drum wall 14a of a driven wheel 14 having on the side a shaft portion 14b, which is rotatably mounted in bushes 19 and 20 provided in a central bore 2b of the wheel body 2. On its opposite side the wheel 14 has an extension forming a pinion 21 for engagement with a transmission gear or any other driven part not shown. Attached to the inner face of each segment of the lining 13 is a spring steel plate 15a, giving the segments a curved initial stressing (Fig. 3) for ensuring, that the ends of the segments readily press on the flanges 12a of the sleeves 12 for balancing the centrifugal masses at low speeds and that the whole of the lining will bear over its entire surface against the drum wall 14a.

In each spoke 5 of the wheel body 2 the compression spring 9 surrounds a stem 15 of a locking member 16, which is loosely guided by the ring 11 but rigidly connected at the inner end to the ring 10. The locking member 16 adjoining the outer end of the stem 15 is slidable within the sleeve 12 and adapted to reach the inside of the drum wall 14a and engage in recesses 17 provided in the same, so that a rigid connection between the wheel body 2 and the driven member 14 can be established. Each locking member 16 has an inclined flank 16a on its rearward end in direction of rotation and the rear of each recess 17 is correspondingly inclined at 17a. At its inner end the bore 6 of each spoke 5 communicates with the central bore 2b of the wheel body 2 through a radial bore 6a of smaller diameter provided in the hub portion of the wheel body 2. In each bore 6a a ball 7 is inserted contacting outwardly with the ball 8.

The driven wheel 14 has a central bore 22 extending from the pinion 21 to the middle shaft portion 14b of the wheel. In the bore 22 a push bar 23 is slidably mounted, which carries on its inner end a transverse driving pin 24, extending through a longitudinal slot 25 in the middle shaft portion 14b. In the bore 22 a helical spring 26 is provided, which exerts an outwardly directed pressure to the inner end of the push bar 23. The ends of the driving pin 24 project on opposite sides from the periphery of the shaft portion 14b and engage in corresponding bores of a ring 27 mounted on the shaft portion 14b and axially slidable within the bore 2b of the wheel body 2 between the bush 19 and an inner shoulder of the hub of the wheel body 2. The ring 27 has on one side a conical face contacting with the balls 7, so that by an axial movement of the ring 27 towards the right in Fig. 1, the latter are forced outwards into the bores 6 of the spokes.

The outer end of the push bar 23 extending from the pinion 21 is pivotally connected to the one arm of a two-armed lever 28, which is mounted so as to pivot with its middle part about a pin 29 fixed to the frame of the vehicle or to the transmission casing. The opposite arm of the lever 28 is connected on its outer end by a link 30 with the arm 31 of a pedal 32, both mounted on a rotatable shaft 33. To the pedal shaft 33 a further lever 34 is fixed, rotatable together with the shaft, which is connected with a rod actuating the normal brakes of the road wheels.

It will be obvious from the foregoing that on rotation of the engine and of the wheel body connected therewith, the balls 8 are thrown outwards by centrifugal force. They are thrown out further, the greater the speed of rotation of the wheel body. The centrifugal force of the balls acts first against the compression springs 9 and the latter through the rings 11 on the sleeves 12, which will then press against the clutch lining 13. Each segment of the lining 13 is pressed at each end by the flange 12a of a sleeve 12 against the inside of the drum wall 14a taking with the wheel body 2 by friction the driven gear wheel 14. The springs 9 are compressed in proportion to the increase of the centrifugal force of the balls 8, which on their outward movement project the stems 15 of the locking members 16, so that finally the latter will reach and engage in the recesses 17 in the drum wall 14a, so that a rigid connection between the wheel body 2 and the driven member 14 is definitely established. An automatic clutch is thus provided which in the first place acting as a friction clutch starts the driven member and which on increasing speed of revolution provides a rigid driving connection of the clutch elements by centrifugal means. When the speed of revolution drops, the stressing of the springs 9 is released by the decrease in the centrifugal force of the balls 8 and the locking members 16 will be withdrawn by the springs into the spokes of the wheel body and finally the pressure on the lining 13 will be relaxed. The driven member can then rotate freely without any substantial friction.

In certain instances it is desirable to lock the clutch elements in the operative position, for example when the vehicle moves downhill in order to give the idling engine a rotation in the same direction as the driven member 14 so as to have a braking action whereby it will not be always necessary to have put the brakes of the driving road wheels into operation. By depression of the pedal 32 the shaft 33 is rotated and with it the arm 31 which transmits the movement through the link 30 and the swinging lever 28 to the push bar 23 which is inwardly pressed against the action of the spring 26. The bar 23 on being pushed inwards transmits its longitudinal movement by means of the connecting pin 24 to the conical ring 27 which moves to the right in Fig. 1. By this movement the conical part of the ring 27 forces the balls 7 outwardly into the bores 6. By this means the balls 8 and the driving members 16 are forced outwards and the latter are held in the recesses 17 of the driven wheel 14. On release of the pedal 32 the spring 26 on expanding returns the ring 27 and the other parts connected therewith into the former position and the balls 7 are free to move inwards again, thus re-establishing the normal working conditions of the centrifugal clutch. Through the rotating pedal shaft 33 and by means of the lever 34 the brake rods of the normal brakes of the driving road wheels can be simultaneously operated. The control mechanism explained above ensures that at any time and preferably when the engine is idling and the centrifugal forces are not sufficient for obtaining an engagement of the drive and the driven member a positive drive engagement can be established.

In Figs. 4–9 a modified constructional form of an automatic centrifugal clutch is illustrated, which embodies a locking mechanism for the clutch elements which is connected with controlling means to be operated by the driver and further with an automatic control for actuating the locking mechanism when the vehicle assumes a forward inclined position. In practice the control mechanism of the clutch will be operated by a single pedal, which simultaneously is operable to control the throttle of the engine and also the normal brakes of the vehicle.

In Fig. 4 those parts of the clutch described above and shown in Figs. 1–3, which have been retained in the present form bear the same reference numerals as before. According to the modification centrifugally operated balls 8a are fixed to the free ends of curved levers 8b which are mounted on pivots 8c fixed in slots of the spokes 5 near the hub of the wheel body 2. The free ends of the pivoting levers 8b with the centrifugal balls 8a extend through a common rearward opening 5a of the wheel body 2. The upper edges of the levers 8b engage with grooves 10c provided in the spherical ends 10a of sliding members 10b guided in the radial bores 6 and rigidly connected with the stems 15 of the locking members 16. The member 10b possesses a greater diameter than the stem 15 and forms on the upper face adjoining the stem an abutment for the lower end of the helical spring 9, the upper end of which contacts with the sleeve 12. On the shaft extension 2a of the wheel body 2 a control sleeve 130 is slidably mounted having on one side a conical face 130a adapted to engage with the lower edges of the curved levers 8b and to press them radially outwards, when moved along the shaft extension 2a into the opening 5a of the wheel body 2. On the levers 8b swinging outwards under the influence of the centrifugal forces of the rotating balls 8a, or caused by engagement of the conical face 130a, their upper edges slide along the slots 10a, thereby pressing on the members 10b and moving same together with the stems 15, and the locking members 16 outwardly against the action of the springs 9.

On the rearward portion of the control sleeve 130 an outer circular groove 130b is provided, which is in engagement with a stirrup member 131, mounted above the sleeve 130. The stirrup member 131 is journalled in the free ends of downwardly extending levers 132, the upper ends of which are fixed to a rotatable shaft 133 extending transversely above the driving shaft portion 2a. At the one end of the shaft 133 a lever 134 is fixed, which projects upwardly in oblique direction. The upper end of the lever 134 is in contact with the lower cam face of a guide bar 135 forming part of a pedal lever 136. The pedal lever 136 is pivotally mounted on a rod 150 and the guide bar 135 is provided at a certain distance from the rod 150. A helical spring 147 is also provided on the pedal lever and normally acts to keep in or to return the lever to the inoperative position (Fig. 5). The cam face of the guide 135 embodies two portions a and b of circular shape lying at different distances from the coinciding centre, represented by the pivoting point 150, and the two portions are connected by an inclined surface 137.

On operation of the pedal lever 136 the guide bar 135 turns together with the said lever about the rod 150 thereby acting on the lever 134, which can assume two different positions. On the portion a of the cam face sliding along the lever 134, the latter remains stationary, while up to the point where it reaches the portion b the lever 134 must slide over the inclined surface 137, during which it is turned and imparts a rotary motion to the shaft 133. On the shaft 133 being turned, the movement is transmitted by the swinging levers 132 and the stirrup 131 to the control sleeve 130, which is caused to slide along the shaft 2a thereby pressing the levers 8b and the locking members 16 connected therewith outwardly, so that the latter engage with the recesses 17 thereby establishing a positive drive connection between the drive and the driven member. Thus along the portion a of the cam face normal automatic operation of the clutch can take place while along the portion b the clutch elements are locked in the operative position.

The pedal lever 136 is also operable to control the throttle of the engine. For this purpose a lever 138 is fixed to the pedal lever 136 which projects from the pivoted end of the said lever and moves together with same. The free end of the lever 138 contacts with the free end of a second lever 139 which is independently pivoted on a shaft 140. Both levers 138 and 139 are arranged with respect to each other in such a way that they can be released after a certain path of travel. The lever 139 is loosely journalled on the shaft 140 and possesses a recess 139a in the hub portion enclosing the said shaft, which engages with the pin 141 projecting from the shaft 140. By this arrangement the lever 139 is free to turn on the shaft to a certain degree. Further a helical spring 145 is fixed to the lever 139, which exerts a downwardly directed tension on the said lever and thereby keeps the one end of the recess 139a in contact with the pin 141. A second lever 142 is rigidly connected with the shaft 140 and adapted to be turned with the same. The free end of the lever 142 is connected with the throttle by a rod 143. A helical spring 144 is secured to the lever 142 and exerts a tension in horizontal forward direction (Fig. 5 and Fig. 8). The pedal lever 136 possesses a further joint at the rear end of the guide bar 135, which is connected with the brakes by a rod 146.

On operation of the pedal lever 136 the rod 143 for the throttle is controlled while the portion a of the cam face slides along the lever 134. During this movement the lever 138 rotates together with the pedal lever in a clockwise direction and presses on the end of the lever 139. On its movement the lever 139 turns the shaft 140 by means of the slot-and-pin connection in an anticlockwise direction, thereby also turning the lever 142 which acts on the throttle of the engine. The path travelled by the lever 139 gives the exact fuel supply from zero to maximum and after the maximum point has been reached the end of the lever 139 is released from the lever 138 and the latter is caused by the spring 144 of the lever 142 and by means of the pin-and-slot connection with the shaft 140 to return into its initial position. For enabling the lever 138 of the pedal to engage in its return motion over the lever 139, the latter is journalled on the shaft 140 so as to turn loosely in the backward rotary direction. The spring 145 causes the lever 139 to be brought into its correct zero positon. Thus, the fuel supply is brought to its maximum as long as the lever 134 rides on the portion a of the guide bar 135. On the lever 134 being rocked through the inclined portion 137 of the guide bar, which corresponds to a movement of the clutch elements into the operative positon, the maximum point of the throttle is reached and the throttle no longer allows fuel to reach the engine. On the pedal being further depressed the lever 134 will ride on the portion b of the guide bar 135. Along the portion b the clutch elements are always operative. This portion can, however, be utilized for operating the brake rod 146 leading to the driving wheels. The spring 147 returns the pedal lever 136 again into its original position when it is released. By this arrangement therefore the vehicle can be started and stopped with one pedal. This is of special importance in cases of danger, as it is no longer necessary for the foot to seek the correct pedal, all that is necessary being completely to depress the accelerator pedal and the vehicle will then slow down.

In steep downward gradients the locking mechanism of the clutch will be automatically operated. For this purpose a weight 148 is suspended in a regulable manner on a downwardly directed arm of a two-armed lever 149 which is pivotally mounted by means of a lug 149a on a rod, for instance the rod 150. The upper end of the opposite arm of the lever 149 is slotted at 151 and in the said slot the end of a downwardly extending lever 152 engages, which is fixed on the shaft 133. An adjusting screw 153 is provided in the slot 151 and contacts on one side with the free end of the lever 152 whereby it is possible to set the lever 149 to a certain inclination with respect to the vertical line.

On the vehicle assuming a forward inclined position owing to the gradient, the lever 149 will be turned through the force of the weight 148 about its pivot 150. On the weighted lever 149 turning, the lever 152 engaging with the slot 151 in the upper arm of the lever 149, and with it the shaft 133 will also be turned, which brings the clutch elements into operation in the above explained manner. When the vehicle is on level ground the angle α of the lever 149 to the horizontal line (Figs. 5 and 7) will amount to 90°. On the vehicle becoming more and more inclined forwards on a downward gradient, the angle α will become smaller and smaller and the angle of inclination β correspondingly greater. By means of the adjusting screw 153 a desired angle of inclination β can be quite accurately set to a value from which the normal automatic clutch operation will not be effective. Preferably normal clutch operation will be allowed to remain operative in slight gradients and be put out of operation only in the case of steep gradients. By this means the reliability of the vehicle is increased very considerably.

I claim:—

1. In a clutch the combination of a driving member, a driven member, a friction lining between the two members, radially disposed guides in the driving member, sliding sleeves in the said guides in contact with the lining, locking members in the said sleeves adapted to engage the driven member, means for resisting the movement of the locking members with respect to the sleeves, centrifugal weights in the driving member in engagement with the locking members and adapted to resiliently press the lining against the driven member and to move subsequently the locking members into engagement with the said driven member and means for independently moving the centrifugal weights into the position of positive drive connection between the said members.

2. In a clutch the combination of a driving member, a driven member, a friction lining between the two members, radially disposed guides in the driving member, sliding sleeves in the said guides in contact with the lining, locking members in the said sleeves adapted to engage the driven member, means for resisting the movement of the locking members with respect to the sleeves, centrifugal weights in the driving member in engagement with the locking members and adapted to resiliently press the lining against the driven member and to move subsequently the locking members into engagement with the driven member, a cam provided in the driving member adapted to engage with the centrifugal weights and to bring same into the position of positive drive connection between the said members and controlling means connected with the cam operable to bring same into and out of engagement with the centrifugal weights.

3. In a clutch the combination of a driving member having radial spokes and a central bore, a driven member provided with a shaft extension journalled in the central bore of the driving member, a friction lining between the two members, guiding bores in the said spokes, radially disposed bores in the driving member connecting the guiding bores with the central bore, sliding sleeves in the said guides in contact with the lining, locking members in the said sleeves adapted to engage the driven member, means for resisting the movement of the locking members with respect to the sleeves, centrifugal balls in the guiding bores radially movable outwardly in engagement with the locking members and adapted to resiliently press the friction lining against the driven member and to subsequently move the locking members into engagement with the said driven member, a cam sleeve mounted axially slidable on the shaft extension of the driven member and in the central bore of the driving member, pressure elements in the connecting bores and in contact with the centrifugal balls and the sleeve and controlling means connected with the sleeve operable to axially displace same into and out of engagement with the pressure elements.

4. In a clutch the combination of a driving shaft, a driving member connected with the said shaft having radial spokes and a central bore, a driven member provided with a shaft extension journalled in the central bore of the driving member, a friction lining between the two members, guiding bores in the said spokes, sliding sleeves in the said guides in contact with the lining, locking members guided in the said sleeves and in the bores of the spokes, adapted to engage the driven member, means for resisting the movement of the locking members with respect to the sleeves, weighted levers pivotally mounted in the spokes radially swingable outwardly in engagement with the locking members and adapted to resiliently press the friction lining against the driven member and to subsequently move the locking members into engagement with the said driven member, a cam sleeve axially slidable on the driving shaft operable to engage with the weighted levers and to press them radially outwardly into the position of positive drive engagement of the drive and driven members and controlling means connected with the sleeve and operable to axially displace same into and out of engagement with the weighted levers.

5. In a clutch the combination of a driving member, a driven member, a friction lining between the two members, radially disposed guides in the driving member, locking members arranged in the guides, clutch weights slidably mounted in the said guides operable to bring the lining into frictional engagement with the driven member and to move the locking members into positive driving connection with the said driven member, a cam provided in the driving member adapted to engage with the centrifugal weights, a control shaft connected with the cam, a lever fixed to the control shaft, and a pedal lever separately mounted near the control shaft and having a cam face engaging with the lever of the control shaft and operable to turn same on movement of the pedal lever.

6. In a clutch for motor driven vehicles according to claim 5, the pedal lever being operatively connected with the throttle of the engine.

7. In a clutch for motor driven vehicles according to claim 5, the pedal lever being operatively connected with the brakes of the vehicle.

8. In a clutch according to claim 5 a further lever fixed to the control shaft, a double-armed lever pivotally mounted near the control shaft having a lower arm provided with an adjustable weight and an upper arm provided with a slot engaging with the lever of the control shaft and operable to turn same independently from the pedal lever.

9. In a clutch the combination of a driving member, a driven member, a friction lining between the two members, radially disposed guides in the driving member, locking members arranged in the guides, clutch weights slidably mounted in the said guides, operable to bring the lining into frictional engagement with the driven member and to move the locking members into positive driving connection with the said driven member, a cam provided in the driving member adapted to engage with the centrifugal weights, a control shaft connected with the cam operable to bring same into and out of engagement with the centrifugal weights, a lever fixed to the control shaft and a weighted lever pivotally mounted near the control shaft and having an arm engaging with the lever of the control shaft and operable to turn same on movement of the weighted lever.

FRITZ KREIS.